United States Patent
Kinoshita et al.

(10) Patent No.: US 8,443,552 B2
(45) Date of Patent: May 21, 2013

(54) MOUNTING STRUCTURE OF DOOR GUARD BAR

(75) Inventors: Kouji Kinoshita, Fujisawa (JP);
Kazuhisa Chiba, Fujisawa (JP);
Yukihito Suzuki, Fujisawa (JP); Hiroki Okada, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 314 days.

(21) Appl. No.: 12/515,140

(22) PCT Filed: Nov. 19, 2007

(86) PCT No.: PCT/JP2007/072402
§ 371 (c)(1),
(2), (4) Date: May 15, 2009

(87) PCT Pub. No.: WO2008/062762
PCT Pub. Date: May 29, 2008

(65) Prior Publication Data
US 2010/0052358 A1 Mar. 4, 2010

(30) Foreign Application Priority Data
Nov. 24, 2006 (JP) ................... 2006-317771

(51) Int. Cl.
*B60J 5/04* (2006.01)
(52) U.S. Cl.
USPC ............... 49/502; 296/146.5; 296/146.6
(58) Field of Classification Search
USPC ............ 49/502; 296/146.1, 152, 146.5, 146.6
See application file for complete search history.

(56) References Cited

U.S. PATENT DOCUMENTS

| | | | | |
|---|---|---|---|---|
| 4,949,508 A | * | 8/1990 | Elton | 49/502 |
| 5,377,450 A | * | 1/1995 | Varajon | 49/502 |
| 6,076,882 A | * | 6/2000 | Szerdahelyi et al. | 296/146.1 |
| 6,149,224 A | * | 11/2000 | Tiberia et al. | 296/146.7 |
| 6,886,881 B1 | * | 5/2005 | Henderson et al. | 296/146.2 |
| 7,635,155 B2 | * | 12/2009 | Guanzon et al. | 296/146.1 |
| 7,661,743 B2 | * | 2/2010 | Williamson et al. | 296/50 |
| 7,757,438 B2 | * | 7/2010 | Syed et al. | 49/502 |

FOREIGN PATENT DOCUMENTS

| | | |
|---|---|---|
| JP | 57-120654 U | 7/1982 |
| JP | 64-40721 U | 3/1989 |
| JP | 3-33525 Y2 | 7/1991 |
| JP | 5-41917 U | 6/1993 |
| JP | 8-1936 Y2 | 1/1996 |
| JP | 2000-71764 A | 3/2000 |

* cited by examiner

Primary Examiner — Gregory J. Strimbu
(74) Attorney, Agent, or Firm — Sughrue Mion, PLLC

(57) ABSTRACT

A vehicle has a mounting structure for mounting a door guard bar. An insertion hole is formed in an upper portion of a trim pad, and a lever-handle accommodating hole is formed in a side portion of the trim pad below the insertion hole. An end portion of a lever handle is inserted into the lever-handle accommodating hole. A cover portion of a bezel is disposed on the inner side of the lever-handle accommodating hole, and covers a part of the lever-handle accommodating hole while exposing an operation portion of the lever handle to the inner side of the vehicle. A door guard bar is inserted into the insertion hole, and fixed to the inner door panel of the vehicle door. The cover portion of the bezel covers the portion of the door guard bar.

2 Claims, 4 Drawing Sheets

MOUNTING STRUCTURE OF DOOR GUARD BAR

TECHNICAL FIELD

The present invention relates to a mounting structure of a door guard bar mounted on a vehicle door.

BACKGROUND ART

For example, there is known a structure in which a door guard bar (waist bar) for protecting a door window panel is disposed on a door window portion of a vehicle door having the door window panel that is not completely accommodated when being lowered as far as possible (when the window is opened completely). Japanese Examined Utility Model Publication No. Hei 8-1936 discloses a structure in which a front end portion and a rear end portion of a door guard bar are provided to a central sash portion and a rear sash portion, respectively.

Patent Document 1: Japanese Examined Utility Model Publication No. Hei 8-1936

DISCLOSURE OF THE INVENTION

Problems to be Solved by the Invention

In the above mounting structure, the front end portion of the door guard bar is provided to the central sash portion. Accordingly, the structure cannot be used for a door having a structure with no central sash portion.

Such an inconvenience can be avoided by: forming a hole portion in a trim pad that is disposed on the inner side, in a vehicle-width direction, of an inner door panel so as to face the inner door panel; inserting a front end portion of a door guard bar into the hole portion; and fixing the front end portion of the door guard bar to the inner door panel.

However, in the fixing operation of the door guard bar, the front end portion of the door guard bar is fixed to the inner door panel with the trim pad attached thereto. For this reason, a hole portion for the fixing operation of the front end portion of the door guard bar needs to be formed in the trim pad in addition to the hole portion into which the front end portion of the door guard bar is inserted. The trim pad is, consequently, formed to have more complicated shape. Additionally, after the door guard bar is mounted, a covering member for closing the hole portion for the operation needs to be provided separately, which increases the number of components.

Therefore, an object of the present invention is to provide a mounting structure of a door guard bar, allowing one end portion of the door guard bar to be fixed to an inner door panel without complicating the shape of a trim pad or increasing the number of components.

Means for Solving the Problems

In order to achieve the above object, a mounting structure of a door guard bar according to the present invention includes an inner door panel, a trim pad, a lever handle, a bezel, and a door guard bar.

The trim pad includes an upper surface portion, a side surface portion, an upper hole portion, and a horizontal hole portion, and is disposed on an inner side, in a vehicle-width direction, of the inner door panel so as to face the inner door panel. The upper surface portion is disposed below a door window portion where the door window panel is raised and lowered. The side surface portion bends from the upper surface portion and extends downward. The upper hole portion is formed in the upper surface portion. The horizontal hole portion is formed in the side surface portion below the upper hole portion. The lever handle includes a base end portion and an operation portion extending from the base end portion. The base end portion is inserted in the horizontal hole portion of the trim pad from an inner side in the vehicle-width direction, and is rotatably supported by the inner door panel. The bezel includes an insertion portion and a cover portion, and is fixed to the inner door panel. The lever handle is inserted in the insertion portion. The cover portion is disposed on an inner side of the horizontal hole portion of the trim pad, and covers at least a part of the horizontal hole portion while exposing the operation portion of the lever handle to the inner side in the vehicle-width direction. The door guard bar includes one end portion which is inserted in the upper hole portion of the trim pad, and which is fixed to the inner door panel at an outer side, in the vehicle-width direction, of the horizontal hole portion. The door guard bar protects the door window panel above the trim pad from the inner side in the vehicle-width direction. The cover portion of the bezel covers the inner side, in the vehicle-width direction, of the one end portion of the door guard bar.

In this configuration, the trim pad is attached to the inner door panel into which the base end portion of the lever handle is inserted from the horizontal hole portion of the trim pad. The base end portion of the lever handle is rotatably supported by the inner door panel. Moreover, the one end portion of the door guard bar is inserted from the upper hole portion of the trim pad to fix the one end portion of the door guard bar to the inner door panel. A jig for fixing the base end portion of the lever handle and the one end portion of the door guard bar is inserted from the horizontal hole portion of the trim pad.

After the door guard bar and the lever handle are mounted, the operation portion of the lever handle is inserted into the insertion portion of the bezel. The bezel is fixed to the inner door panel. In this state, an inner end, in the vehicle-width direction, of the one end portion of the door guard bar is covered by the bezel.

In this manner, the fixing operation of the one end portion of the door guard bar can be performed by utilizing the horizontal hole portion for mounting the lever handle. Thereby, a hole portion for the fixing operation of the one end portion of the door guard bar does not need to be formed in the trim pad additionally, and the trim pad does not have a complicated shape any more.

Moreover, the inner end, in the vehicle-width direction, of the one end portion of the door guard bar is covered by the bezel disposed in the horizontal hole portion for mounting the lever handle therein. Thereby, after the door guard bar is mounted, a covering member for sealing the hole portion for the operation does not need to be provided additionally, and the number of components does not increase any more.

Effects of the Invention

According to the present invention, one end portion of a door guard bar is fixed to an inner door panel without incurring a complication in the shape of a trim pad and an increase in the number of components.

Figure 1:
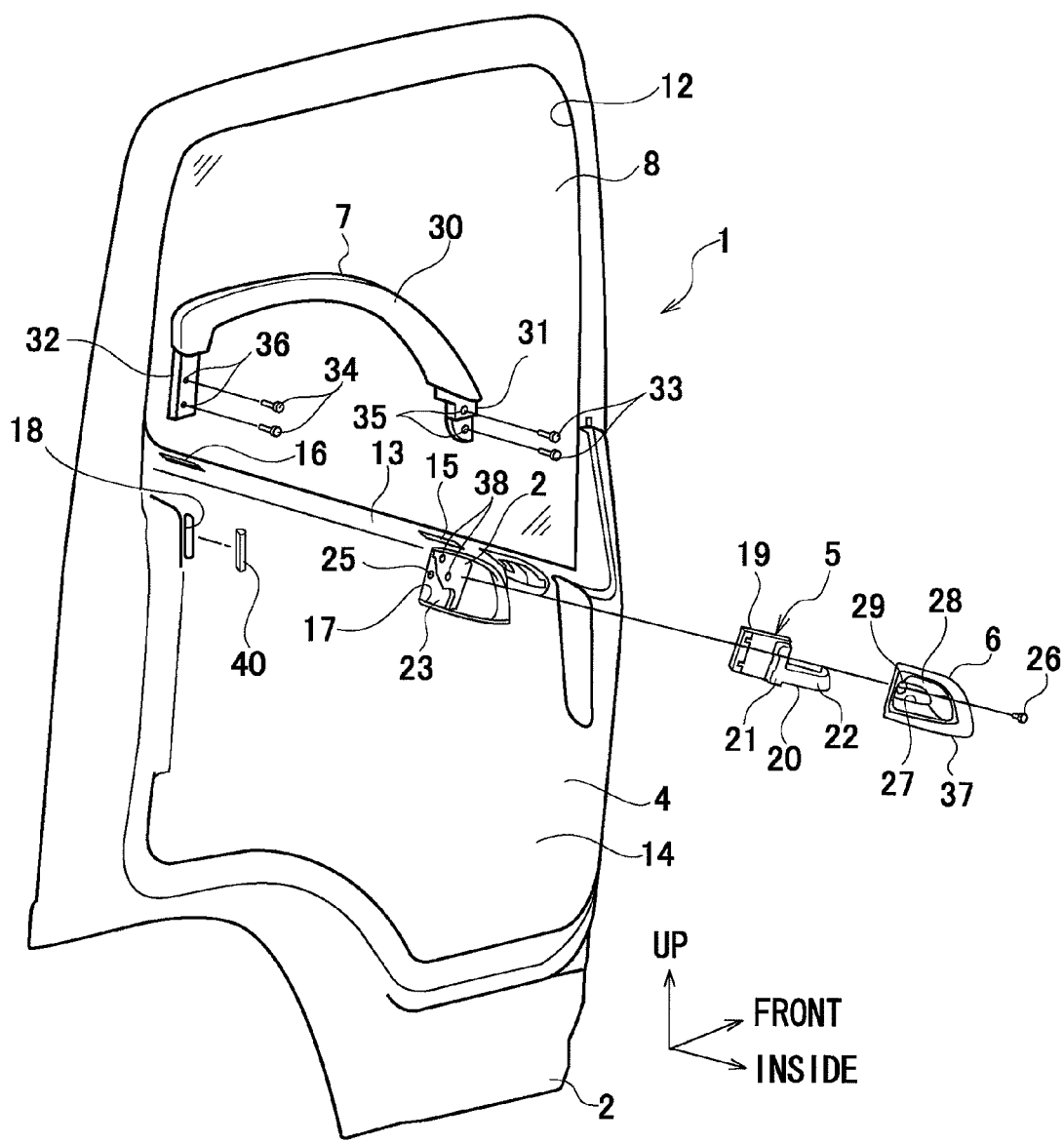
FIG. 1 is an exploded perspective view schematically showing a vehicle door according to a present embodiment.

EXPLANATION OF REFERENCE NUMERALS 1 door (side door)
2 inner door panel
3 outer door panel
4 trim pad
5 lever handle unit
6 bezel
7 door guard bar
8 door window panel
9 closed space
12 door window portion
13 upper surface portion
14 side surface portion
15 front-side guard-bar insertion hole (upper hole portion)
16 rear-side guard-bar insertion hole
17 lever-handle accommodating hole (horizontal hole portion)
18 rear-side guard-bar mounting operation hole
19 base
20 lever handle
21 base end portion
22 operation portion
27 insertion portion
28 cover portion
31 front end portion (one end portion)
37 peripheral lip portion

BEST MODES FOR CARRYING OUT THE INVENTION

Figure 2:
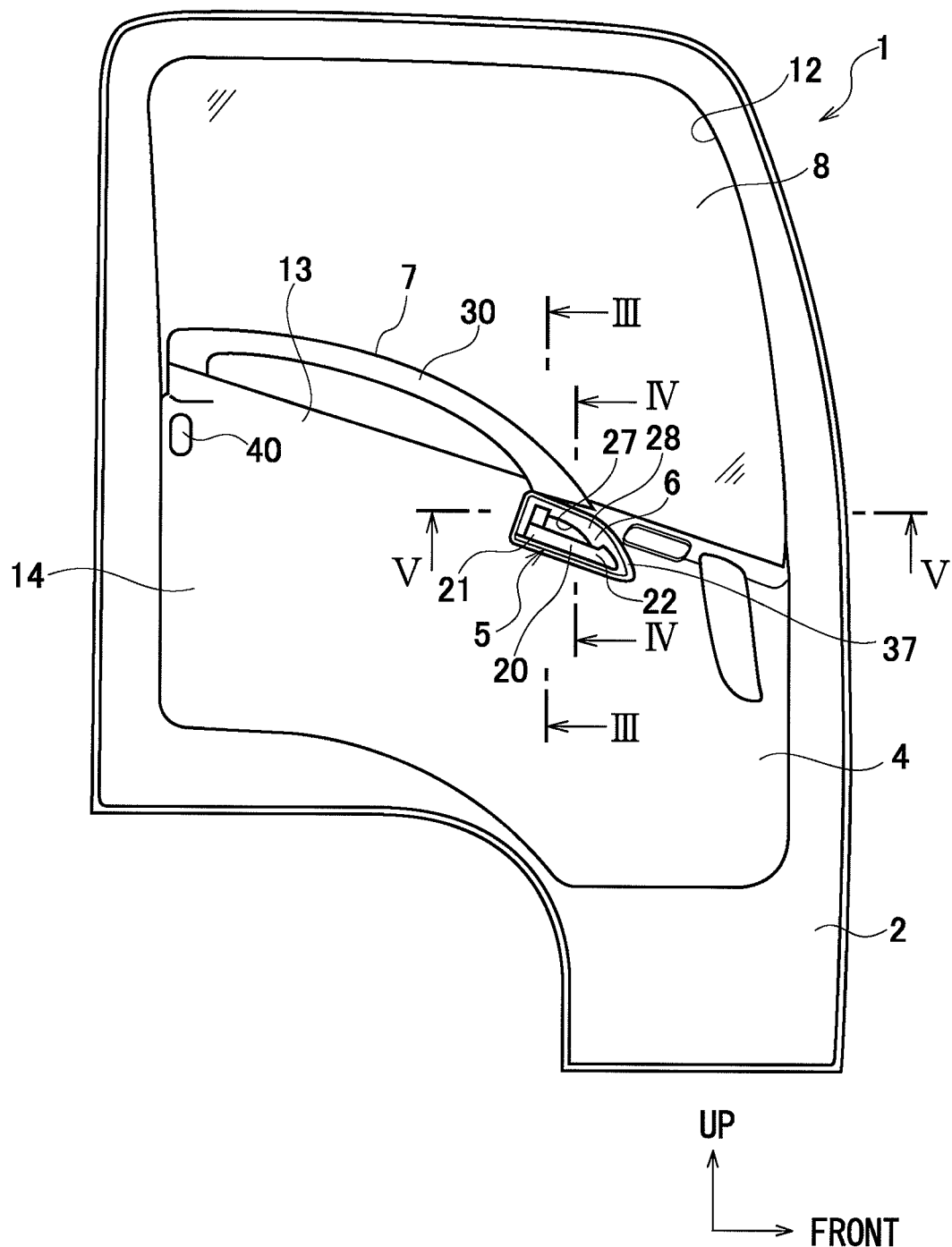
FIG. 2 is a side view of the door in FIG. 1 as viewed from the inner side in a vehicle-width direction.
Figure 3:
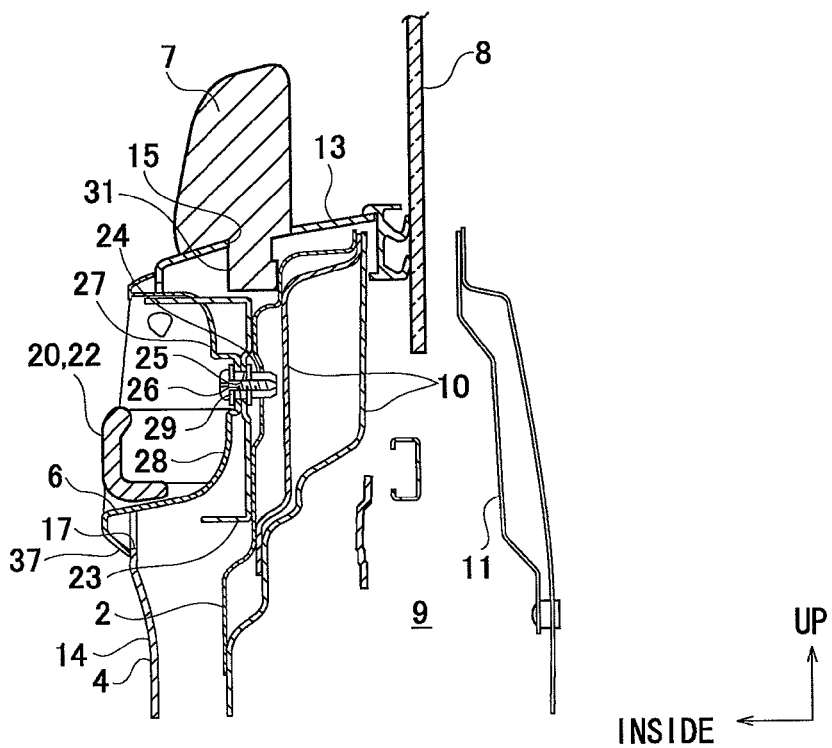
FIG. 3 is a cross-sectional view as viewed from the III-III arrow direction in FIG. 2.
Figure 4:
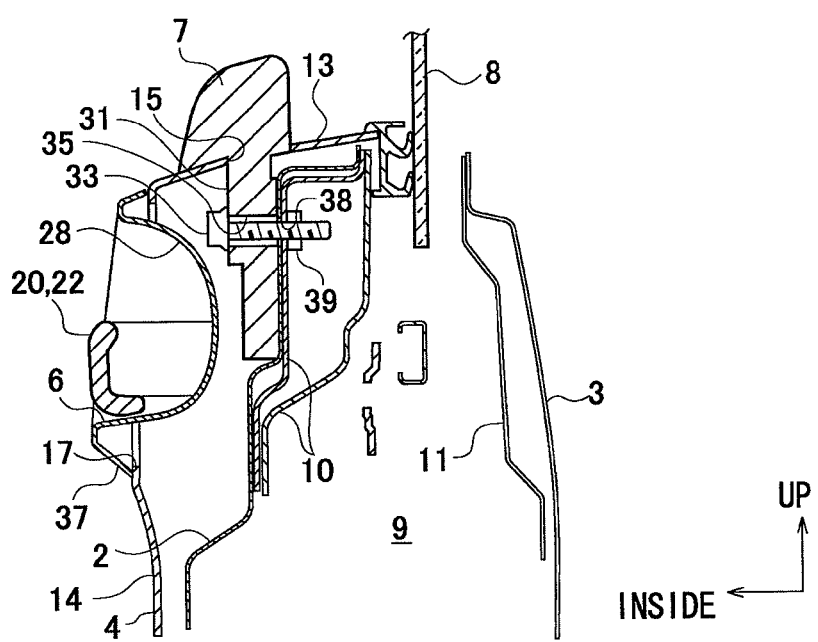
FIG. 4 is a cross-sectional view as viewed from the IV-IV arrow direction in FIG. 2.
Figure 5:
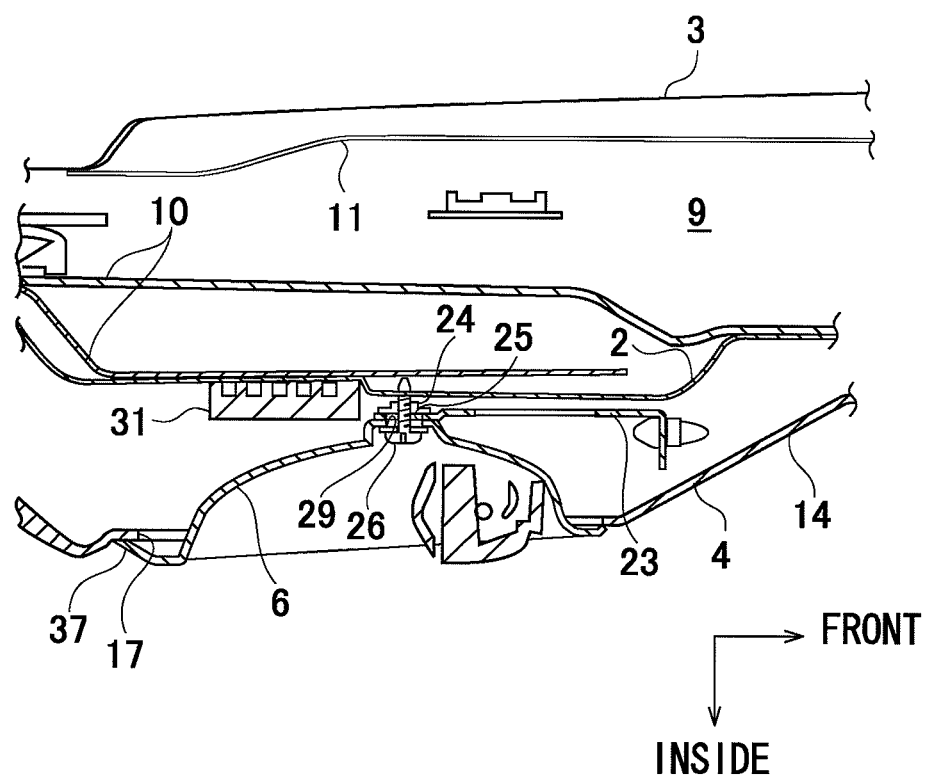
FIG. 5 is a cross-sectional view as viewed from the V-V arrow direction in FIG. 2.

Hereinafter, one embodiment of the present invention will be described with reference to the drawings. FIG. 1 is an exploded perspective view schematically showing a vehicle door according to the present embodiment. FIG. 2 is a side view of the door in FIG. 1 as viewed from the inner side in a vehicle-width direction. FIG. 3 is a cross-sectional view as viewed from the III-III arrow direction in FIG. 2. FIG. 4 is a cross-sectional view as viewed from the IV-IV arrow direction in FIG. 2. FIG. 5 is a cross-sectional view as viewed from the V-V arrow direction in FIG. 2. Note that, in the drawings, "FRONT" indicates the front side of the vehicle, "UP" indicates the upper side of the vehicle, and "INSIDE" indicate the inner side in the vehicle-width direction. Additionally, in the following description, the outer side and the inner side in the vehicle-width direction mean the outer side and the inner side in the vehicle-width direction at the time the door is closed.

As shown in FIG. 1 to FIG. 5, a door (side door) 1 for opening and closing a vehicle compartment includes an inner door panel 2, an outer door panel 3, a trim pad 4, a lever handle unit 5, a bezel 6, a door guard bar 7, and a door window panel 8.

The inner door panel 2 is disposed on the inner side, in the vehicle-width direction, of the outer door panel 3 so as to face the outer door panel 3. A closed space 9 is formed and defined between the inner door panel 2 and the outer door panel 3. The peripheral portions of the respective two panels 2, 3 join each other. A door inner reinforcement 10 and a door outer reinforcement 1, which are reinforcing members, join inner surfaces, on the closed space 9 side, of the inner door panel 2 and the outer door panel 3, respectively.

A door window portion 12 is defined in an upper portion of the door 1. The door window panel 8 is raised from and lowered into the closed space 9 to close and open the door window portion 12.

The trim pad 4 includes an upper surface portion 13 and a side surface portion 14. The trim pad 4 is disposed on the inner side, in the vehicle-width direction, of the inner door panel 2 so as to face the inner door panel 2, and fixed to the inner door panel 2. The upper surface portion 13 is disposed below the door window portion 12, and the side surface portion 14 bends from the inner periphery, in the vehicle-width direction, of the upper surface portion 13 and extends downward. A front-side guard-bar insertion hole (upper hole portion) 15 and a rear-side guard-bar insertion hole 16 are formed respectively in a front portion and a rear portion of the upper surface portion 13. A lever-handle accommodating hole (horizontal hole portion) 17 and a rear-side guard-bar mounting operation hole 18 are formed respectively in a front portion and a rear portion of the side surface portion 14. The lever-handle accommodating hole 17 has a shape that is horizontally long and substantially rectangular, while positioned immediately below the front-side guard-bar insertion hole 15. The rear-side guard-bar mounting operation hole 18 has a shape that is vertically long and substantially rectangular, while positioned immediately below the rear-side guard-bar insertion hole 16.

A lever-handle fixing bracket 23 joins an outer surface, on the outer side in the vehicle-width direction, of the inner door panel 2, the outer surface facing the lever-handle accommodating hole 17 in the trim pad 4. A bezel mounting hole 25 is formed in the lever-handle fixing bracket 23. A weld nut 24 for screwing a bolt 26 to fasten and fix the bezel 6 is fitted into the bezel mounting hole 25.

The lever handle unit 5 includes a base 19 and a lever handle 20, and is disposed on the inner side, in the vehicle-width direction, of the door 1 (inner side of the compartment). The lever handle 20 includes: a base end portion 21 rotatably supported by the base 19; and an operation portion 22 extending from the base end portion 21. The lever handle 20 is connected to a locking mechanism for opening/closing door (unillustrated) via a link (unillustrated), and allows the opening of the door 1 by being operated by a passenger. The lever handle unit 5 is inserted into the lever-handle accommodating hole 17 in the trim pad 4 from the inner side in the vehicle-width direction. In such a state, the base 19 is fastened and fixed to the lever-handle fixing bracket 23. Thereby, the base end portion 21 of the lever handle 20 is rotatably supported by the inner door panel 2.

The bezel 6 includes a peripheral lip portion 37, an insertion portion 27 and a cover portion 28. The outer periphery of the peripheral lip portion 37 is formed much larger than the lever-handle accommodating hole 17 in the trim pad 4. The cover portion 28 is shaped to have a curved surface that expands outwardly in the vehicle-width direction from the inner periphery of the peripheral lip portion 37. The cover portion 28 is disposed on the inner side of the lever-handle accommodating hole 17 in the trim pad 4. The insertion portion 27 is formed in the cover portion 28, and the lever handle 20 is inserted into the insertion portion 27. A bolt insertion hole 29 into which the bolt 26 is inserted is formed in the cover portion 28. By screwing the bolt 26 into the weld nut 24, the cover portion 28 is fastened and fixed to the lever-handle fixing bracket 23. By inserting the lever handle 20 into the insertion portion 27, the cover portion 28 is fastened and fixed to the lever-handle fixing bracket 23 with the bolt 26 and the weld nut 24. Thereby, the bezel 6 is fixed to the inner door panel 2. The cover portion 28 covers at least a part of the lever-handle accommodating hole 17 while exposing the operation portion 22 of the lever handle 20 to the inner side in the vehicle-width direction (inner side of the compartment).

The door guard bar 7 includes: an arm portion 30 having a curved shape swelling out upward; a front end portion (one end portion) 31 extending downward from a front end of the arm portion 30; and a rear end portion 32 extending downward from a rear end of the arm portion 30. Two bolt insertion holes 35 are formed in the front end portion 31, and two bolt insertion holes 36 are formed in the rear end portion 32. Here, bolts 33, 34 are inserted into the bolt insertion holes 35, 36, respectively.

The front end portion 31 is inserted into the front-side guard-bar insertion hole 15 in the trim pad 4, and is positioned between the lever-handle accommodating hole 17 and the inner door panel 2. Bolt insertion holes 38, which communicate with the bolt insertion holes 35, are formed in the inner door panel 2 and the door inner reinforcement 10 while the front end portion 31 is inserted in the front-side guard-bar insertion hole 15. Weld nuts 39 are welded to the outer surface, in the vehicle-width direction, of the door inner reinforcement 10. The weld nuts 39 are for screwing bolts 33 inserted into the bolt insertion holes 35, 38. Similarly, the rear end portion 32 is inserted into the rear-side guard-bar insertion hole 16 in the trim pad 4, and is positioned between the rear-side guard-bar mounting operation hole 18 and the inner door panel 2. Bolt insertion holes (unillustrated), which communicate with the bolt insertion holes 36, are formed in the inner door panel 2 and the door inner reinforcement (unillustrated) while the rear end portion 32 is inserted in the rear-side guard-bar insertion hole 16. Weld nuts (unillustrated) are welded to the outer surface, in the vehicle-width direction, of the door inner reinforcement. The weld nuts are for screwing the bolts 34 inserted into the bolt insertion holes 36. Note that the rear-side guard-bar mounting operation hole 18 is capped with a covering member 40.

After the trim pad 4 is attached to the inner door panel 2, the door guard bar 7 is mounted before or simultaneously with the mounting operation of the lever handle unit 5.

The lever handle unit 5 is mounted as follows. The base end portion 21 and the base 19 of the lever handle 20 of the lever handle unit 5 are inserted from the lever-handle accommodating hole 17 of the trim pad 4. The base 19 is fastened and fixed to the lever-handle fixing bracket 23 by using a jig such as a driver. At this point, the jig such as a driver is inserted from the lever-handle accommodating hole 17.

The door guard bar 7 is mounted as follows. The front end portion 31 and the rear end portion 32 are inserted into the front-side guard-bar insertion hole 15 and the rear-side guard-bar insertion hole 16, respectively. Then, the front end portion 31 is fastened and fixed to the inner door panel 2 by using a jig such as a driver. At this point, the jig such as a driver is inserted from the lever-handle accommodating hole 17. Similarly, the rear end portion 32 is fastened and fixed to the inner door panel 2 by using a jig such as a driver. At this time, the jig such as a driver is inserted from the rear-side guard-bar mounting operation hole 18.

After the door guard bar 7 and the lever handle unit 5 are mounted, the operation portion 22 of the lever handle 20 is inserted into the insertion portion 27 of the bezel 6. The bezel 6 is fastened and fixed to the lever-handle fixing bracket 23 by using a jig such as a driver. In this state, the peripheral lip portion 37 of the bezel 6 comes close to or comes into contact with the inner surface, in the vehicle-width direction, of the trim pad 4 in the vicinity of the outer side of the lever-handle accommodating hole 17. The inner end, in the vehicle-width direction, of the front end portion 31 of the door guard bar 7 is covered by the cover portion 28 of the bezel 6. Moreover, rear-side guard-bar mounting operation hole 18 is capped with the covering member 40.

In this manner, it is possible to perform the fixing operation of the front end portion 31 of the door guard bar 7 by utilizing the lever-handle accommodating hole 17 for mounting the lever handle unit 5. Thereby, a hole portion for the fixing operation of front end portion 31 of the door guard bar 7 does not need to be formed in the trim pad 4 additionally, and the trim pad 4 does not have a complicated shape any more.

Moreover, the inner end, in the vehicle-width direction, of the front end portion 31 of the door guard bar 7 is covered by the bezel 6 disposed in the lever-handle accommodating hole 17 for mounting the lever handle unit 5 therein. Thereby, after the door guard bar 7 is mounted, a covering member for sealing the lever-handle accommodating hole 17 for the operation does not need to be provided any more, and the number of components does not increase.

It should be noted that, in the above embodiment, the front end portion 31 of the door guard bar 7 is disposed so as to match the lever-handle accommodating hole 17. However, when the lever handle unit 5 is disposed at a rear portion of the door 1, the rear end portion 32 of the door guard bar 7 may be disposed so as to match the lever-handle accommodating hole.

Hereinabove, the description has been given of the embodiment to which the invention made by the present inventor is applied. However, the description and the drawings constituting parts of the disclosure of the present invention according to this embodiment are not construed to limit the present invention. To put it differently, it goes without saying that other embodiments, examples, operation technologies, and the like made by those skilled in the art on the basis of this embodiment are all included in the scope of the present invention.

A mounting structure of a door guard bar according to the present invention is suitably used in various vehicles.

The invention claimed is:

1. A mounting structure comprising:
   an inner door panel;
   a trim pad disposed on an inner side, in a vehicle-width direction of a vehicle, of the inner door panel to face the inner door panel, the trim pad including:
      an upper surface portion disposed below a door window portion of the vehicle in which a door window panel of the vehicle is raised and lowered,
      a side surface portion extending downwardly and curved from the upper surface portion,
      an upper hole portion formed in the upper surface portion, and
      a horizontal hole portion formed in the side surface portion below the upper hole portion;
   a lever handle including:
      a base end portion inserted into the horizontal hole portion of the trim pad from an inner side of the trim pad, in the vehicle-width direction, and rotatably supported by the inner door panel, and
      an operation portion extending from the base end portion;
   a bezel fixed to the inner door panel, the bezel including:
      an insertion portion in which the lever handle is disposed, and
      a cover portion disposed in the horizontal hole portion of the trim pad and covering at least a part of the horizontal hole portion while exposing the operation portion of the lever handle to the inner side of the trim pad in the vehicle-width direction; and a door guard bar including one end portion disposed in the upper hole portion of the trim pad and fixed to the inner door panel via the horizontal hole portion, the door guard bar protecting the door window panel when raised above the trim pad, wherein the cover portion of the bezel covers an inner side, in the vehicle-width direction, of the one end portion of the door guard bar, and comprises a curved surface portion, the curved surface portion of the cover portion comprises an insertion hole for fastening the bezel to the inner door panel, the bezel is fastened to the inner door panel by a first bolt disposed in the insertion hole of the cover portion, and the door guard bar is fastened to the inner door panel by a second bolt inserted through the horizontal hole portion of the trim pad.

2. The mounting structure according to claim 1, wherein the bezel further comprises:

a peripheral lip portion disposed at an outer periphery of the bezel, wherein the curved surface portion of the cover portion curves from the peripheral lip portion toward the inner door panel.

* * * * *